(12) United States Patent
Williams et al.

(10) Patent No.: US 6,355,733 B1
(45) Date of Patent: Mar. 12, 2002

(54) POLYETHYLENE BLENDS AND FILMS

(75) Inventors: Kelly L. Williams, Loveland; Leonard V. Cribbs, Hamilton; Stephen M. Imfeld, Mason, all of OH (US); Venki Chandrashekar, Houston, TX (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/688,314

(22) Filed: Oct. 13, 2000

(51) Int. Cl.$^7$ .................. C08L 23/00; C08L 23/04; C08L 33/02; C08L 33/04

(52) U.S. Cl. .................. 525/191; 525/211; 525/222; 525/239; 525/240

(58) Field of Search ................... 525/191, 222, 525/221, 239, 240

(56) References Cited

U.S. PATENT DOCUMENTS

| | | |
|---|---|---|
| 4,086,204 A | 4/1978 | Cassandrini et al. |
| 4,331,586 A | 5/1982 | Hardy |
| 4,542,199 A | 9/1985 | Kaminsky et al. ........... 526/160 |
| 4,812,500 A | 3/1989 | Hayden ....................... 524/99 |
| 5,539,124 A | 7/1996 | Etherton et al. ............. 548/402 |
| 5,637,660 A | 6/1997 | Nagy et al. .................. 526/160 |
| 5,756,611 A | 5/1998 | Etherton et al. ........... 526/333.8 |
| 5,962,598 A | 10/1999 | Mack et al. ............... 525/333.8 |
| 6,034,027 A | 3/2000 | Krishnamurti et al. ....... 502/200 |
| 6,171,993 B1 | 1/2001 | Mavridis et al. ............. 502/103 |

*Primary Examiner*—Nathan M. Nutter
(74) *Attorney, Agent, or Firm*—Shao Guo

(57) ABSTRACT

A blend comprising a high molecular weight, medium density polyethylene (HMW, MDPE) and a linear low density polyethylene (LLDPE) is disclosed. The blend comprises from about 20 wt % to about 80 wt % of HMW MDPE. The HMW MDPE has a density from about 0.92 to about 0.944 g/cc, a melt index $MI_2$ from about 0.01 to about 0.5 dg/min, and a melt flow ratio MFR from about 50 to about 300. The blend also comprises about 20 wt % to about 80 wt % of LLDPE. The LLDPE has a density within the range of about 0.90 to about 0.925 g/cc and an $MI_2$ within the range of about 0.50 to about 50 dg/min. The blend provides films with significantly improved toughness and tear strength compared to MDPE or HDPE, and high modulus compared to LLDPE.

21 Claims, No Drawings

POLYETHYLENE BLENDS AND FILMS

FIELD OF THE INVENTION

The invention relates to polyethylene blends. The blends comprise a high molecular weight, medium density polyethylene (HMW MDPE) and a linear low density polyethylene (LLDPE). The invention also relates to films made from the blends.

BACKGROUND OF THE INVENTION

Polyethylene is divided into high density (HDPE, density 0.941 g/cc or greater), medium density (MDPE, density from 0.926 to 0.940 g/cc), low density (LDPE, density from 0.910 to 0.925 g/cc) and linear low density polyethylene (LLDPE, density from 0.910 to 0.925 g/cc). (See ASTM D4976-98: Standard Specification for Polyethylene Plastic Molding and Extrusion Materials.) One of the main uses of polyethylene (HDPE, LLDPE, and LDPE) is in film applications, such as grocery sacks, institutional and consumer can liners, merchandise bags, multi-wall bag liners, produce bags, deli wrap, and shrink wrap. The key physical parameters of polyethylene film include tear strength, impact strength, tensile strength, stiffness and clarity. Tear strength is measured in machine direction (MD) and transverse direction (TD). Total tear strength (the product of MD tear and TD tear) is an indicator of overall tear properties. Critical processing properties on the film line include the output, bubble stability, gauge control (variability in film thickness), extruder pressure and temperature.

Film stiffness can be measured by modulus. Modulus is the resistance of the film to deformation under stress. It relates to its density. A higher density gives a higher modulus. A typical LLDPE film has a modulus of about 32,000 psi, while a HDPE film has a modulus of about 100,000 psi or higher. LLDPE film has higher impact strength and MD tear, while HDPE has higher stiffness and tensile strength. When LLDPE producers attempt to increase the density (thereby increasing the modulus of the film), they often encounter losses in impact strength and MD tear. Historically, blending LLDPE and HDPE has not achieved "breakthrough" success. The blends often give films that have improved stiffness and tensile properties, but the impact and tear properties are usually sacrificed. There are no straightforward methods or single resins that have the combined properties of both.

While there are few polyethylene films of modulus between about 40,000 psi and about 90,000 psi, there is an increasing demand for such films. For example, gardening has become one of the largest hobbies by dollars spent in the United States. To support gardeners, a variety of products need to be commercially available in large and small packages. Because consumer perception is important, the bags need to possess a high aesthetic appearance and excellent mechanical integrity. When consumers load 50-lb bags of fertilizer or pesticide into their cars, they need to feel comfortable and safe. This requires the bags to be easy to handle and stack, to resist puncture and tear propagation, to have good sealability and excellent seal strength, and to be glossy and printable. Existing films for these markets are primarily LLDPE resins. Although HDPE films are more similar to the paper packaging that they have replaced in these industries, HDPE films do not have the impact and tear properties essential for acceptable durability standards.

Recently, a high molecular weight, medium density polyethylene (HMW MDPE) has been developed (see copending appl. Ser. No. 09/648,303 (docket No. 88-1026A) filed on Aug. 25, 2000). The HMW MDPE has many unique properties and offers new opportunities for improvement of polyethylene films.

SUMMARY OF THE INVENTION

The invention is a blend comprising a high molecular weight, medium density polyethylene (HMW MDPE) and a linear low density polyethylene (LLDPE). The blend comprises from about 20 wt % to about 80 wt % of HMW MDPE. The HMW MDPE has a density from about 0.92 to about 0.944 g/cc, a melt index $MI_2$ from about 0.01 to about 0.5 dg/min, and a melt flow ratio MFR from about 50 to about 300. It has a multimodal molecular weight distribution comprising a high molecular weight component and a low molecular weight component. The low molecular weight component has an $MI_2$ from about 50 to about 600 dg/min and a density from about 0.94 to about 0.97 g/cc. The blend also comprises about 20 wt % to about 80 wt % of LLDPE. The LLDPE has a density within the range of about 0.90 to about 0.925 g/cc and an $MI_2$ within the range of about 0.50 to about 50 dg/min.

The invention also includes a film prepared from the blend and a method for making the film. We have surprisingly found that blending the HMW MDPE and a high performance, conventional or single-site LLDPE gives the film toughness and tear strength similar to LLDPE with stiffness and tensile properties similar to medium density HDPE films.

DETAILED DESCRIPTION OF THE INVENTION

The blend of the invention comprises from about 20 wt % to about 80 wt % of a high molecular weight, medium density polyethylene (HMW MDPE). Preferably, the blend comprises from about 30 wt % to about 70 wt % of HMW MDPE. The HMW MDPE has a density within the range of about 0.92 to about 0.944 g/cc. Preferably, the density is within the range of about 0.935 to about 0.944 g/cc. Preferred HMW MDPE is a copolymer that comprises from about 85 to about 98 wt % of recurring units of ethylene and from about 2 to about 15 wt % of recurring units of a $C_3$ to $C_{10}$ α-olefin. Suitable $C_3$ to $C_{10}$ α-olefins include propylene, 1-butene, 1-pentene, 1-hexene, 4-methyl-1-pentene, and 1-octene, and the like, and mixtures thereof.

The HMW MDPE has an $MI_2$ from about 0.01 to about 0.5 dg/min, preferably from about 0.01 to about 0.3 dg/min, and an MFR from about 50 to about 300. Melt index ($MI_2$) is usually used to measure polymer molecular weight, and melt flow ratio (MFR) is used to measure the molecular weight distribution. A larger $MI_2$ indicates a lower molecular weight. A larger MFR indicates a broader molecular weight distribution. MFR is the ratio of the high-load melt index (HLMI) to $MI_2$. The $MI_2$ and HLMI can be measured according to ASTM D-1238. The $MI_2$ is measured at 190° C. under 2.16 kg pressure. The HLMI is measured at 190° C. under 21.6 kg pressure. The HMW MDPE has a considerably higher molecular weight (or lower $MI_2$) and broader molecular weight distribution (or larger MFR) than conventional HDPE or LLDPE.

The HMW MDPE has a multimodal molecular weight distribution. By "multimodal molecular weight distribution," we mean not only that the HMW MDPE has at least two different molecular weight components, but also that the two components differ chemically and structurally from each other. The low molecular weight component has an $MI_2$ within the range of about 50 to about 600 dg/min, while the high molecular weight component preferably has an $MI_2$ less than about 0.5 dg/min. The high molecular weight (low $MI_2$) component gives the polyethylene superior bubble stability in a blown film process and the low molecular weight (high $MI_2$) component gives the polyethylene excellent processability. Furthermore, the low molecular weight component has a density from about 0.94 to about 0.97 g/cc (i.e., in the range of conventional HDPE), while the high molecular weight component preferably has a density from 0.90 to 0.94 g/cc, more preferably from 0.91 to 0.94 g/cc, which is similar to the conventional LLDPE.

Copending appl. Ser. No. 09/648,303 (docket No. 88-1026A) filed on Aug. 25, 2000, the teachings of which are herein incorporated by reference, teaches preparation of the HMW MDPE by a multiple zone process with Ziegler catalysts. For example, a HMW MDPE can be produced by polymerizing an olefin mixture containing from about 85 to about 98 wt % of ethylene and from about 2 to about 15 wt % of a $C_3$ to $C_{10}$ α-olefin in a first reaction zone to produce a first polymer, removing some volatile materials from the first polymer, and then continuing the polymerization in a second reaction zone by adding more of the olefin mixture.

The blend of the invention comprises from about 20 wt % to about 80 wt % of a linear low density polyethylene (LLDPE). Preferably, the blend comprises from about 30 wt % to about 70 wt % of LLDPE. The LLDPE has a density within the range of about 0.90 to about 0.925 g/cc and an $MI_2$ within the range of about 0.5 to about 50 dg/min. LLDPE can be produced by Ziegler catalysts or newly developed single-site catalysts. Ziegler catalysts are well known. Examples of suitable Ziegler catalysts for making LLDPE include titanium halides, titanium alkoxides, vanadium halides, and mixtures thereof. Ziegler catalysts are used with cocatalysts such as alkyl aluminum compounds.

Single-site catalysts can be divided into metallocene and non-metallocene. Metallocene single-site catalysts are transition metal compounds that contain cyclopentadienyl (Cp) or Cp derivative ligands. For example, U.S. Pat. No. 4,542,199, the teachings of which are incorporated herein by reference, teaches metallocene catalysts. Non-metallocene single-site catalysts contain ligands other than Cp but have the same catalytic characteristics as metallocenes. The non-metallocene single-site catalysts may contain heteroatomic ligands, e.g., boraaryl, pyrrolyl, azaborolinyl or quinolinyl. For example, U.S. Pat. Nos. 6,034,027, 5,539,124, 5,756,611 and 5,637,660, the teachings of which are incorporated herein by reference, teach non-metallocene catalysts.

LLDPE resins are usually copolymers of ethylene with 5 to 15 wt % of a long chain α-olefin such as 1-butene, 1-hexene, and 1-octene. Higher puncture resistance and tear strength are typical of LLDPE films. Great impact resistance and tear strength can be achieved by using 1-octene as the comonomer. Conventional 1-hexene based LLDPE is inferior to that made with 1-octene. However, higher performance 1-hexene based LLDPE, which has comparable properties to 1-octene based LLDPE, has been developed (see, e.g., U.S. patent appl. Ser. No. 09/205,481, filed Dec. 4, 1998). Usually, when conventional HDPE and LLDPE are blended, the blend does not perform synergistically. However, we have surprisingly found that when LLDPE is blended with the newly developed HMW MDPE described above, the blend exhibits better performance than the sum of the single components. We believe that these benefits result from the improved compatibility of the more amorphous HMW-MDPE and much broader MWD compared to conventional MDPE or HDPE resins. Also, by blending HMW-MDPE with LLDPE, film densities can be achieved as low as current commercial LLDPE offerings and as high as commercial MDPE offerings, thus bridging the modulus gap between LLDPE and HDPE without sacrificing impact and tear properties.

Optionally, the blend contains a third polymer. Adding a third polymer into the blend can either enhance the performance of the product or reduce the cost. For example, addition of a third polymer may increase the printability or the clarity of the film. Suitable third polymers include polyethylene resins other tan specified above, e.g., low density polyethylene (LDPE) and HDPE, polypropylene, polyester, acrylic resin, polyvinyl alcohol, polyvinyl chloride, polyvinyl acetate, polyvinyl ether, ethylene-vinyl acetate copolymers (EVA), ethylene-vinyl alcohol copolymers (EVOH), ethylene-acrylic acid copolymers, and the like, and mixtures thereof. A third polymer is added in an amount preferably less than 50 wt % of the total blend.

Optionally, the blend also contains antioxidants, UV-absorbents, flow agents, or other additives. The additives are well known in the art. For example, U.S. Pat. Nos. 4,086,204, 4,331,586 and 4,812,500, the teachings of which are herein incorporated by reference, teach UV stabilizers for polyolefins. Additives are added in an amount preferably less than 10 wt % of the total blend.

Any suitable blending technique can be used. The polymers and optional additives can be blended in solution or in thermal processing. Melt screw extrusion is preferred. The resulting blend preferably has a density within the range of about 0.925 to about 0.935 g/cc and an $MI_2$ within the range of about 0.1 to about 0.5 dg/min.

The invention includes films made from the blends. The films include films of thickness less than 10 mils and sheets of thickness greater than 10 mils. One advantage of the invention is that the blend film can be produced with conventional film equipment for LLDPE or on high stalk film equipment for HMW-HDPE. For typical HDPE or MDPE resins, lowering the density may reduce the bubble stability while processing on a high stalk film line. In spite of the lower density, the blend film of the invention exhibits excellent bubble stability on a high stalk extrusion line. The blend film can be produced on either a high stalk film line or a conventional, in-the-pocket LLDPE film line. Another advantage of the blend film is that it exhibits superior total tear properties compared to conventional HDPE or MDPE. With the lower density, the blend film feels softer than the conventional is HDPE or MDPE films. Yet the films have much better tensile strength than that produced from LLDPE resins, resulting in good handle and yield strength in bags. In thicker film gauges used in heavy duty shipping sacks, the blend film exhibits outstanding tear and impact properties.

Methods for making polyethylene films are known. For example, U.S. Pat. No. 5,962,598, the teachings of which are herein incorporated by reference, teaches how to produce biaxially oriented films made in high stalk extrusion. In the process, polyethylene melt is fed by an extruder through a die gap (0.8 to 2 mm) in an annular die to produce a molten tube that is pushed vertically upward. At this point, the molten tube is approximately the same size as the annular die. Pressurized air is fed to the interior of the tube to increase the tube diameter to give a "bubble." The volume of air injected into the tube controls the size of the tube or the resulting blow-up ratio. In high stalk extrusion, the increase in the tube diameter occurs at a height of approximately 5–12 times the die diameter. This distance is referred to as the stalk or neck height. The expanded tube produces the desired biaxial orientation of the film that results in the balance of tear and impact properties of HMW HDPE resins. The tube is rapidly cooled by a cooling ring on the outside surface of the film. The bubble is collapsed between a pair of nip rollers and wound onto a film roll by the film winder. Collapsing of the tube is done after initial cooling at a point so that the wall surfaces will not adhere to one another. Mechanical strength of the film is defined in two directions, along the polymer flow exiting the die or machine direction (MD) and perpendicular to the polymer flow exiting the die or transverse direction (TD).

The following examples merely illustrate the invention. Those skilled in the art will recognize many variations that are within the spirit of the invention and scope of the claims.

EXAMPLE 1

Preparation of HMW MDPE

A catalyst is prepared according to U.S. Pat. No. 4,464,518. The catalyst is dispersed in hexane to yield a catalyst slurry that contains about 1.4 wt % of solids. The catalyst slurry (0.059 parts per hour), triethyl aluminum cocatalyst (0.0033 parts per hour), hexane (41.0 parts per hour), 1-butene (0.37 parts per hour) and ethylene (16.9 parts per hour) are continuously fed into a first reactor. The reactor pressure is controlled at about 140 psig, the temperature at 82° C., and the molar ratio of hydrogen to ethylene in the vapor space at about 3.8 to give a first polymer. The first polymer has an $MI_2$ of 220 dg/min and a density of 0.953 g/cc.

The first polymer is transferred to a flash drum, where a portion of the volatile materials are removed. The mixture is then transferred to a second reactor. Hexane (42.9 parts per hour), 1-butene (1.23 parts per hour) and ethylene (18.6 parts per hour) are continuously fed into the second reactor. The reactor temperature is maintained at 77° C., and the molar ratio of hydrogen to ethylene in the vapor space at about 0.05 to give a second polymer that has an $MI_2$ of about 0.08 dg/min and a density of 0.936 g/cc.

The second polymer is isolated and dried under nitrogen. The dried powder is then compounded in the presence of 5% oxygen in the presence of a suitable stabilization package to give a polyethylene having an $MI_2$ of 0.05 dg/min, MFR of 145, and density of 0.938 g/cc.

The resulting polyethylene is converted into a film with a thickness of 0.5 mil on a blown film line with a 60 mm grooved feed extruder at screw speed of 61 rpm. The extruder is equipped with a 120 mm mono layer die with a 1.2 mm die gap. The film is produced at a stalk height of six die diameters at a blow up ratio (BUR) of 4:1. The film has a modulus 90,000 psi, bubble stability rating 44, machine direction tear strength (MD tear) 10.4 g, transverse direction tear strength (TD tear) 98 g, total tear strength 1019, and total energy dart drop (TEDD) 1.9 ft-lb.

EXAMPLE 2

Blend of HMW MDPE and LLDPE in 35/65 by Weight

The HMW MDPE prepared in Example 1 is blended with a commercial LLDPE (Petrothene Select Super Hexene LLDPE, product of Equistar Chemical Company) in a ratio of 35/65 by weight. The LLDPE has an $MI_2$ 0.70 dg/min and density 0.918 g/cc. The LLDPE and HMW MDPE resins are dry blended and fed into extruder. The blend has $MI_2$ 0.30 dg/min and density 0.927 g/cc. The resulting blend is converted into a film with a thickness of 1.0 mil on a 200 mm die with 1.5 mm die gap. The film is produced at a stalk height of six die diameters at a blow up ratio (BUR) of 4:1. The film has a modulus 52,000 psi, MD tear 200 g, TD tear 425 g, and Dart Drop 915 g.

EXAMPLE 3

Blend of HMW MDPE and LLDPE in 55/45 by Weight

Example 2 is repeated, but the ratio of HMW MDPE/LLDPE is 55/45 by weight. The blend has $MI_2$ 0.20 dg/min and density 0.931 glcc. The film has a modulus 62,000 psi, MD tear 125 g, TD tear 350 g, and Dart Drop 690 g.

Comparative Example 4

LLDPE Film

A 1.0 mil film is prepared from Petrothene Select Super Hexene LLDPE. The film has a modulus 32,000 psi, MD tear 330 g, TD tear 620 g, and Dart Drop 920 g.

TABLE 1

Summary of Physical Properties of Invention vs. LLDPE at Thin Gauge (1.0 mils)

| Example No | 1 | 2 | 3 | C4 |
|---|---|---|---|---|
| HMW MDPE/LLDPE Ratio by Weight | 100/0 | 35/65 | 55/45 | 0/100 |
| $MI_2$, dg/min | 0.05 | 0.30 | 0.20 | 0.70 |
| Pellet Density, g/cc | 0.938 | 0.927 | 0.931 | 0.918 |
| Modulus, psi | 90,000 | 52,000 | 62,000 | 32,000 |
| MD TEAR, g | 44 | 200 | 125 | 330 |
| TD TEAR, g | 224 | 425 | 350 | 620 |
| Dart Drop, g | 380 | 915 | 690 | 920 |

EXAMPLES 5–7

Thick Films of Blends

Examples 1–3 are repeated. The resulting blends are converted into films with a thickness of 4.0 mil on a 200 mm die with 1.5 mm die gap. The film is produced at a stalk height of six die diameters at a blow up ratio (BUR) of 4:1. The physical properties of the films are summarized in Table 2.

Comparative Example 8

Thick Film of LLDPE

A thick film is prepared from Petrothene Select Super Hexene LLDPE. The film has a modulus 32,200 psi, MD tear 2200 g, TD tear 2300 g, and Dart Drop 1015 g.

The examples have demonstrated that the blend films of the invention (Examples 2, 3, 6 and 7) have significantly improved tear strength and toughness compared to MDPE, while maintaining high modulus. The combination of high tear strength, toughness and high modulus makes the blend films very suitable for heavy duty bags such as bags for fertilizers and pesticides.

TABLE 2

Summary of Physical Properties of
Invention vs. LLDPE at Thick Gauge (4.0 mils)

| Example No | 5 | 6 | 7 | C8 |
|---|---|---|---|---|
| HMW MDPE/LLDPE Ratio by Weight | 100/0 | 35/65 | 55/45 | 0/100 |
| MI$_2$, dg/min | 0.05 | 0.3 | 0.2 | 0.7 |
| Pellet Density, g/cc | 0.938 | 0.927 | 0.931 | 0.918 |
| Modulus, psi | 85,500 | 52,000 | 59,500 | 32,000 |
| MD TEAR, g | 515 | 1275 | 1015 | 2200 |
| TD TEAR, g | 510 | 1907 | 1775 | 2300 |
| Dart Drop, g | 610 | 810 | 650 | 1015 |

We claim:

1. A polymer blend which comprises:
   (a) from about 20 wt % to about 80 wt % of a high molecular weight, medium density polyethylene that has a density within the range of about 0.92 to about 0.944 g/cc, an MI$_2$ within the range of about 0.01 to about 0.5 dg/min, an MFR within the range of about 50 to about 300, and a multimodal molecular weight distribution comprising a low molecular weight component and a high molecular weight component wherein the low molecular weight component has an MI$_2$ from about 50 to about 600 dg/min and a density from about 0.94 to about 0.97 g/cc; and
   (b) from about 20 wt % to about 80 wt % of a linear low density polyethylene that has a density within the range of about 0.90 to about 0.925 cc/g and an MI$_2$ within the range of about 0.5 to about 50 dg/min.

2. The blend of claim 1 that has a density within the range of about 0.925 to about 0.935 g/cc.

3. The blend of claim 1 that has an MI$_2$ within the range of about 0.1 to about 0.5 dg/min.

4. The blend claim 1 that has a density within the range of about 0.925 to about 0.935 g/cc and an MI$_2$ within the range of about 0.1 to about 0.5 dg/min.

5. The blend of claim 1 wherein the linear low density polyethylene is a copolymer of ethylene with an α-olefin selected from the group consisting of propylene, 1-butene, 1-pentene, 1-hexene, 1-octene, 4-methyl-1-pentene, and mixtures thereof.

6. The blend of claim 1 wherein the linear low density polyethylene is a copolymer of ethylene with 1-hexene.

7. The blend of claim 1 wherein the high molecular weight, medium density polyethylene has a density within the range of about 0.93 to about 0.944 g/cc.

8. The blend of claim 1 wherein the high molecular weight, medium density polyethylene has an MI$_2$ within the range of about 0.01 to about 0.3 dg/min.

9. The blend of claim 1 that further comprises a polymer selected from the group consisting of low density polyethylene, high density polyethylene, polypropylene, polyester, acrylic resin, polyvinyl alcohol, polyvinyl chloride, polyvinyl acetate, polyvinyl ether, ethylene-vinyl acetate copolymers, ethylene-vinyl alcohol copolymers, ethylene-acrylic acid copolymers, and mixtures thereof.

10. A film produced from a polymer blend that comprises:
    (a) from about 20 wt % to about 80 wt % of a high molecular weight, medium density polyethylene that has a density within the range of about 0.92 to about 0.944 g/cc, an MI$_2$ within the range of about 0.01 to about 0.5 dg/min, an MFR within the range of about 50 to about 300, and a multimodal molecular weight distribution comprising a low molecular weight component and a high molecular weight component wherein the low molecular weight component has an MI$_2$ from about 50 to about 600 dg/min and a density from about 0.94 to about 0.97 g/cc; and
    (b) from about 20 wt % to about 80 wt % of a linear low density polyethylene that has a density within the range of about 0.90 to about 0.925 cc/g and an MI$_2$ within the range of about 0.5 to about 50 dg/min.

11. The film of claim 10 wherein the linear low density polyethylene is a copolymer of ethylene with an α-olefin selected from the group consisting of propylene, 1-butene, 1-pentene, 1-hexene, 1-octene, 4-methyl-1-pentene, and mixtures thereof.

12. The film of claim 10 wherein the linear low density polyethylene is a copolymer of ethylene with 1-hexene.

13. The film of claim 10 wherein the high molecular weight, medium density polyethylene has a density within the range of about 0.93 to about 0.944 g/cc.

14. The film of claim 10 wherein the high molecular weight, medium density polyethylene has an MI$_2$ within the range of about 0.01 to about 0.3 dg/min.

15. The film of claim 10 that has an MD modulus within the range of about 35,000 to about 85,000 psi when the film has a thickness of about 1 mil.

16. A method for preparing a film, said method comprises:
    (a) blending
       (i) from about 20 wt % to about 80 wt % of a high molecular weight, medium density polyethylene that has a density within the range of about 0.92 to about 0.944 g/cc, an MI$_2$ within the range of about 0.01 to about 0.5 dg/min, an MFR within the range of about 50 to about 300, and a multimodal molecular weight distribution comprising a low molecular weight component and a high molecular weight component wherein the low molecular weight component has an MI$_2$ from about 50 to about 600 dg/min and a density from about 0.94 to about 0.97 g/cc; and
       (ii) from about 20 wt % to about 80 wt % of a linear low density polyethylene that has a density within the range of about 0.90 to about 0.925 cc/g and an MI$_2$ within the range of about 0.5 to about 50 dg/min; and
    (b) converting the product of (a) into a film.

17. The method of claim 16 wherein the linear low density polyethylene is a copolymer of ethylene with an α-olefin selected from the group consisting of propylene, 1-butene, 1-pentene, 1-hexene, 1-octene, 4-methyl-1-pentene, and mixtures thereof.

18. The method of claim 16 wherein the linear low density polyethylene is a copolymer of ethylene with 1-hexene.

19. The method of claim 16 wherein the high molecular weight, medium density polyethylene has a density within the range of about 0.93 to about 0.944 g/cc.

20. The method of claim 16 wherein the high molecular weight, medium density polyethylene has an MI$_2$ within the range of about 0.01 to about 0.3 dg/min.

21. The method of claim 16 wherein the film has an MD modulus within the range of about 35,000 to about 85,000 psi when the film has a thickness of about 1 mil.

* * * * *